(12) United States Patent
Wang et al.

(10) Patent No.: US 9,732,669 B2
(45) Date of Patent: Aug. 15, 2017

(54) WASTEGATE VALVE SEAT POSITION DETERMINATION

(71) Applicant: Ford Global Technologies, LLC, Dearborn, MI (US)

(72) Inventors: Yan Wang, Ann Arbor, MI (US); Vladimir V. Kokotovic, Bloomfield Hills, MI (US); Amey Y. Karnik, Ann Arbor, MI (US); Eric Luehrsen, Dearborn, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 14/189,836

(22) Filed: Feb. 25, 2014

(65) Prior Publication Data

US 2015/0240707 A1    Aug. 27, 2015

(51) Int. Cl.
| | |
|---|---|
| F02D 41/06 | (2006.01) |
| F01N 3/20 | (2006.01) |
| F02B 37/16 | (2006.01) |
| F02B 37/18 | (2006.01) |
| F02D 41/00 | (2006.01) |
| F02D 41/24 | (2006.01) |

(52) U.S. Cl.
CPC ............ *F02B 37/186* (2013.01); *F02B 37/16* (2013.01); *F02D 41/0007* (2013.01); *F02D 41/248* (2013.01); *F02D 41/2438* (2013.01); *F02D 41/2464* (2013.01); *F02D 41/062* (2013.01); *Y02T 10/144* (2013.01)

(58) Field of Classification Search
CPC .... F02B 37/16; F02B 37/186; F02D 41/0007; F02D 41/2438; F02D 41/2464; F02D 41/248; F02D 41/062; Y02T 10/144

USPC ................................................. 60/602, 605.1
See application file for complete search history.

(56) References Cited

U.S. PATENT DOCUMENTS

| 3,446,473 A | 5/1969 | Barker | |
|---|---|---|---|
| 4,197,711 A * | 4/1980 | Fuhrmann | ............... F02B 37/18 60/602 |

(Continued)

FOREIGN PATENT DOCUMENTS

EP    2107225 A1    10/2009

OTHER PUBLICATIONS

Li, Yunfeng et al., "Track-Following Control with Active Vibration Damping of a PZT-Actuated Suspension Dual-Stage Servo System," Institute of Electrical and Electronics Engineers, Proceedings of the American Control Conference, Denver, Co., Jun. 4-6, 2003, 18 pages.

(Continued)

*Primary Examiner* — Mark Laurenzi
*Assistant Examiner* — Dapinder Singh
(74) *Attorney, Agent, or Firm* — Julia Voutyras; McCoy Russell LLP

(57) ABSTRACT

Various methods for compensating variation in the geometry and position of linkages and valve seats in wastegate assemblies are provided. In one example, a method of operating a wastegate in an internal combustion engine comprises, at engine startup, placing a wastegate valve at a seat, recording a position of the seat and associating the seat position with one or more operating parameters, and modifying a position of a wastegate actuator based on the seat position throughout engine operation.

19 Claims, 6 Drawing Sheets

(56) References Cited

U.S. PATENT DOCUMENTS

| | | | |
|---|---|---|---|
| 4,387,572 A * | 6/1983 | Richardson | F02B 37/164 |
| | | | 60/602 |
| 5,058,537 A | 10/1991 | Paul et al. | |
| 6,147,831 A | 11/2000 | Kennedy et al. | |
| 6,614,613 B1 | 9/2003 | Huang et al. | |
| 7,434,397 B2 | 10/2008 | Hasegawa | |
| 7,562,527 B2 | 7/2009 | Eiraku | |
| 7,775,043 B2 | 8/2010 | Funke et al. | |
| 8,051,644 B2 | 11/2011 | Gonze et al. | |
| 2007/0289302 A1 | 12/2007 | Funke et al. | |
| 2010/0011764 A1 | 1/2010 | Andrews | |
| 2011/0173974 A1 * | 7/2011 | Grabowska | F01D 17/105 |
| | | | 60/602 |
| 2012/0001111 A1 | 1/2012 | Takeda et al. | |
| 2013/0189072 A1 | 7/2013 | Wade | |

OTHER PUBLICATIONS

Wang, Yan et al., "Determination of Wastegate Valve Position," U.S. Appl. No. 14/014,156, filed Aug. 29, 2013, 48 pages.

Luehrsen, Eric et al., "Wastegate Control," U.S. Appl. No. 14/286,702, filed May 23, 2014, 33 pages.

Kokotovic, Vladmir V. et al., "Electric Waste Gate Control System Sensor Calibration With End-Stop Detection," U.S. Appl. No. 13/896,257, filed May 16, 2013, 33 pages.

* cited by examiner

WASTEGATE VALVE SEAT POSITION DETERMINATION

FIELD

The disclosure relates to control of a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side of an engine and the compressor is coupled to an intake manifold side of the engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve anywhere between a fully open position and a fully closed position (e.g., at a valve seat) to achieve the desired boost based on operating conditions. The actuator may be an electric actuator such as a motor, for example. A position sensor may provide feedback indicating the location of the actuator relative to a reference point. Depending on surrounding conditions, the linkage may be subjected to significantly large forces, vibration, and temperatures.

In some approaches, a wastegate valve is coupled to a wastegate actuator via a four-bar linkage, separating the actuator from the valve by a distance in order to protect the actuator from high temperatures proximate the valve. In this manner, actuator degradation that otherwise might result from such high temperatures may be prevented. Further, lash in the gears and/or linkage can create measurement errors due to the separation of the measurement from the valve itself. Other types of linkages may couple a wastegate valve to an associated actuator, however, such as a linear rod.

The inventors herein have recognized a problem with such approaches. Thermal deformation including expansion and contraction may take place in the turbocharger and linkage as component temperature vary and particularly increase. Further, thermally-induced movement of the valve seat may occur, thereby moving the seat relative to the actuator, linkage, and measurement of the wastegate valve. Thus, in some scenarios, thermal and mechanical deformation may occur in a wastegate assembly at regions other than the linkage itself, which may alter the position of a valve seat against which a wastegate valve is abutted at its fully closed position when the supply of boost is not desired. Such variation in the geometric properties of linkages and valve seats reduce the accuracy with which a wastegate valve may be positioned, in turn reducing the accuracy of boost supply. Further, a linkage may deflect (e.g., bend) when subject to relatively high forces including those applied to the linkage by an actuator and/or exhaust forces due to the surrounding environment.

Methods for compensating variation in the geometry and position of linkages and valve seats in wastegate assemblies are thus provided.

In one example, a method of operating a wastegate in an internal combustion engine comprises, at engine startup, placing a wastegate valve at a seat, recording a position of the seat and associating the seat position with one or more operating parameters, and modifying a position of a wastegate actuator based on the seat position throughout engine operation.

In a more specific example, the method further comprises recording a plurality of seat positions and associating each of the plurality of seat positions with the one or more operating parameters as the wastegate valve is placed at the seat throughout engine operation.

In another aspect of the example, the method further comprises as the wastegate valve is placed at the seat throughout engine operation, incrementing the position of the wastegate actuator by adding a current margin to a current presently supplied to the wastegate actuator, and estimating deflection in a linkage coupling the wastegate valve to the wastegate actuator based on change in output from a wastegate actuator position sensor, the change in output resulting from incrementing the position of the wastegate actuator.

In still another aspect of the example, placing the wastegate valve at the seat includes retrieving a previously-recorded seat position from the data structure, placing the wastegate valve at the previously-recorded seat position, incrementing the position of the wastegate actuator by adding a current margin to a current presently supplied to the wastegate actuator, and recording a current seat position once output from a wastegate actuator position sensor falls below a threshold.

In the examples described above, variation in wastegate valve seat position, linkage geometry (e.g., deflection, thermal expansion/contraction), and overall wastegate assembly geometry which would otherwise result in inaccurate wastegate valve positioning is compensated. Positions of the wastegate actuator may be modified based on determined valve seat positions. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Compression devices such as a turbocharger may be used to increase the output of an internal combustion engine. A wastegate may in part regulate the boost pressure supplied to the engine by positioning a wastegate valve to thereby control the amount of exhaust gas reaching a turbine of the turbocharger. The wastegate valve may be positioned via an actuator with a linkage disposed therebetween. Accurate wastegate valve positioning and thus accurate boost control may be degraded, however, by a variety of operational factors including thermal deformation in the linkage, valve seat, and overall turbocharger assembly due to high surrounding temperatures, as well as mechanical stress that may deflect or otherwise deform (e.g., bend) portions of the wastegate assembly including the linkage. Thus, strategies designed to mitigate these issues may attempt to compensate two or more constituent factors.

Figure 1:
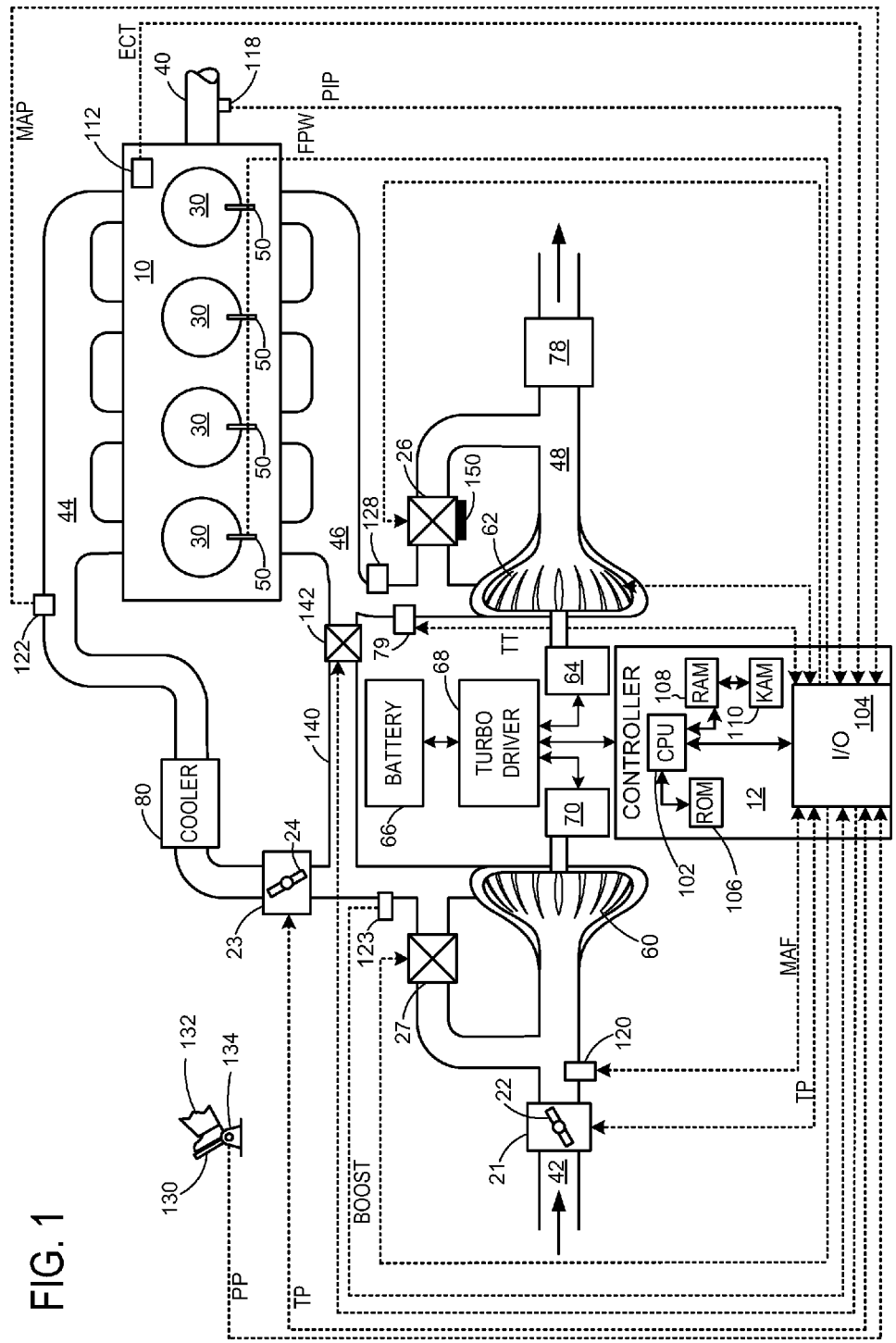
FIG. 1 shows a block diagram of a turbocharged engine including a wastegate.
Figure 2:
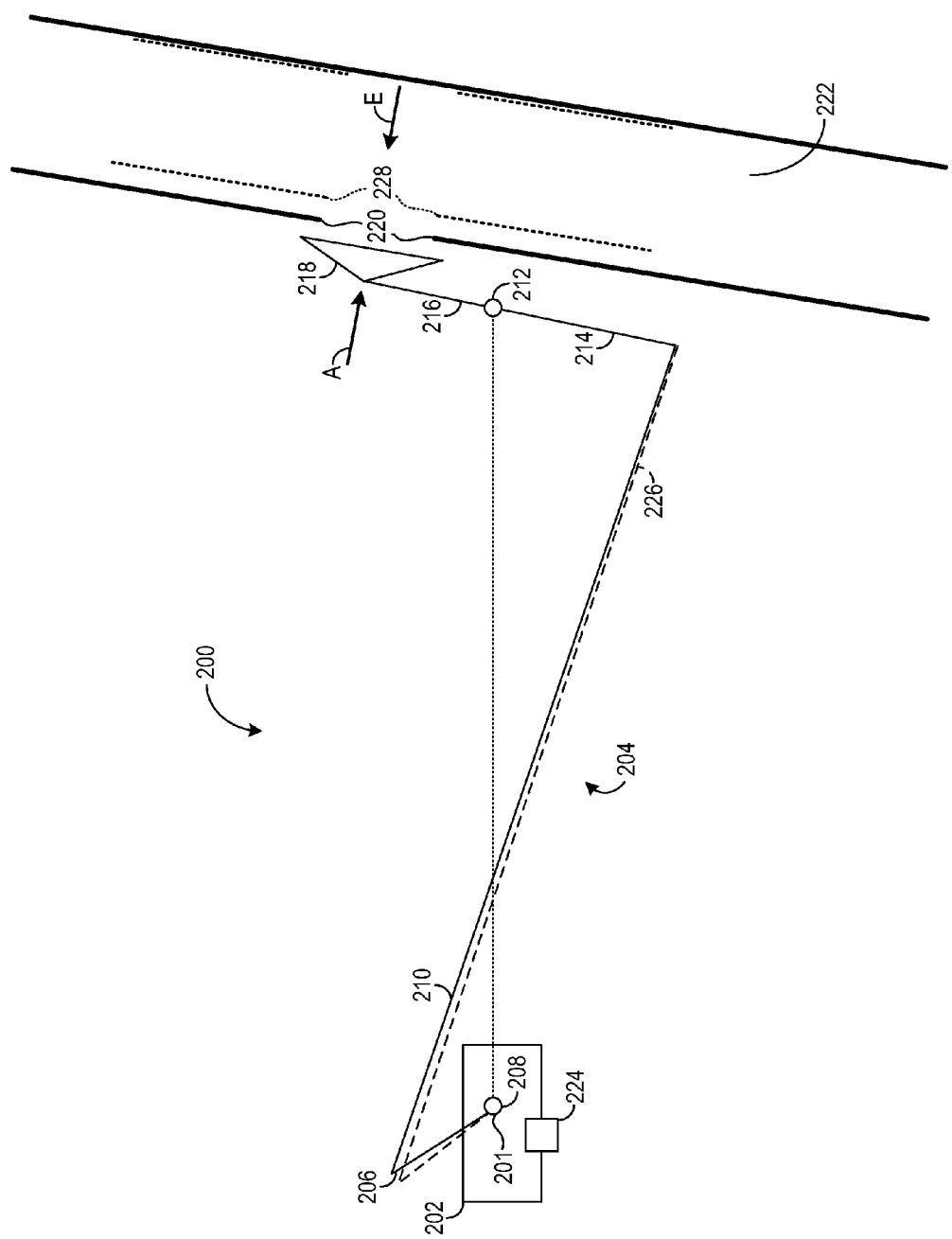
FIG. 2 shows an exemplary arrangement of the wastegate of FIG. 1.
Figure 3A:
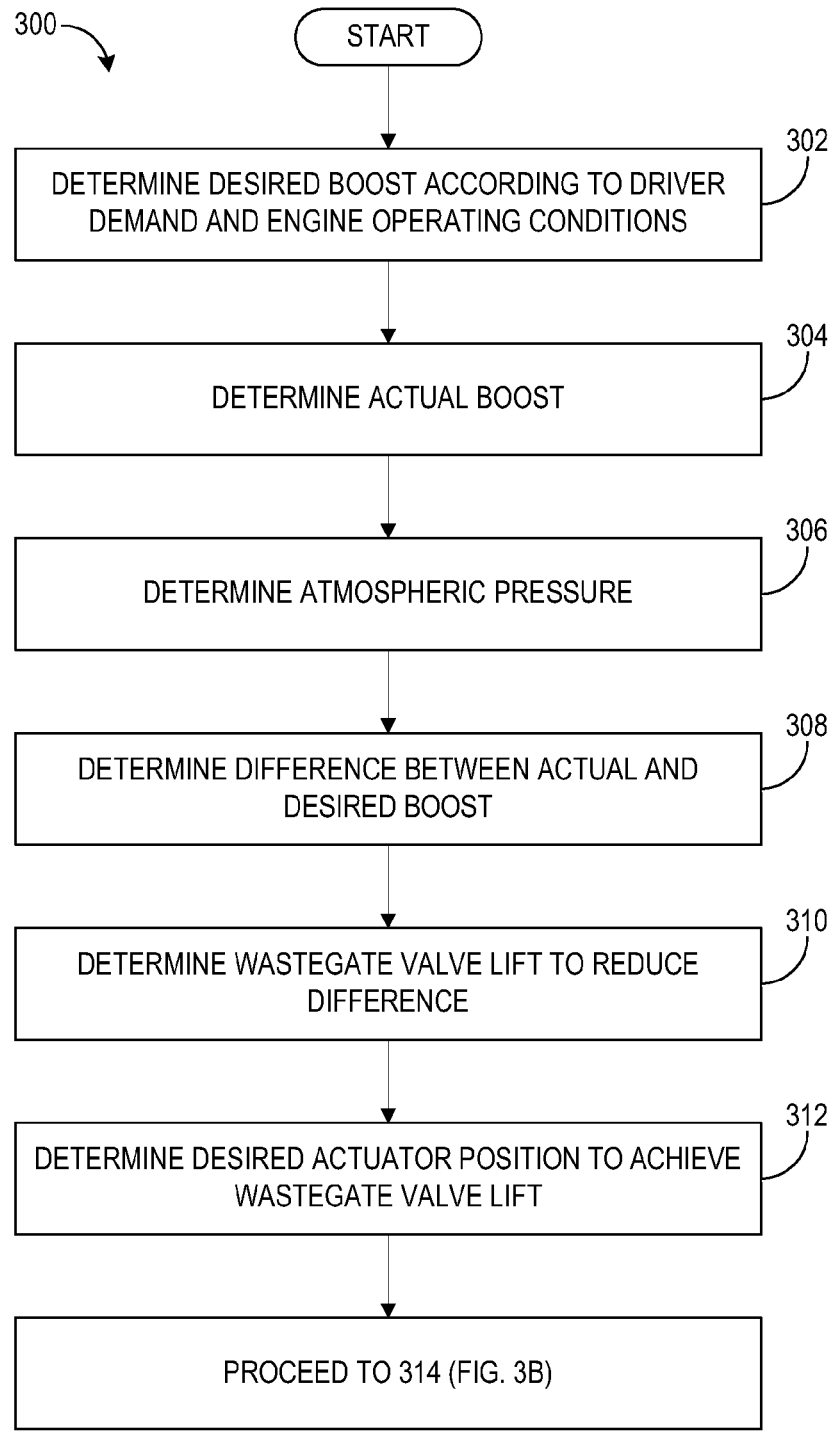
FIGS. 3A & 3B show a flowchart illustrating a method for controlling a turbocharger associated with the wastegate arrangement of FIG. 2.
Figure 3B:
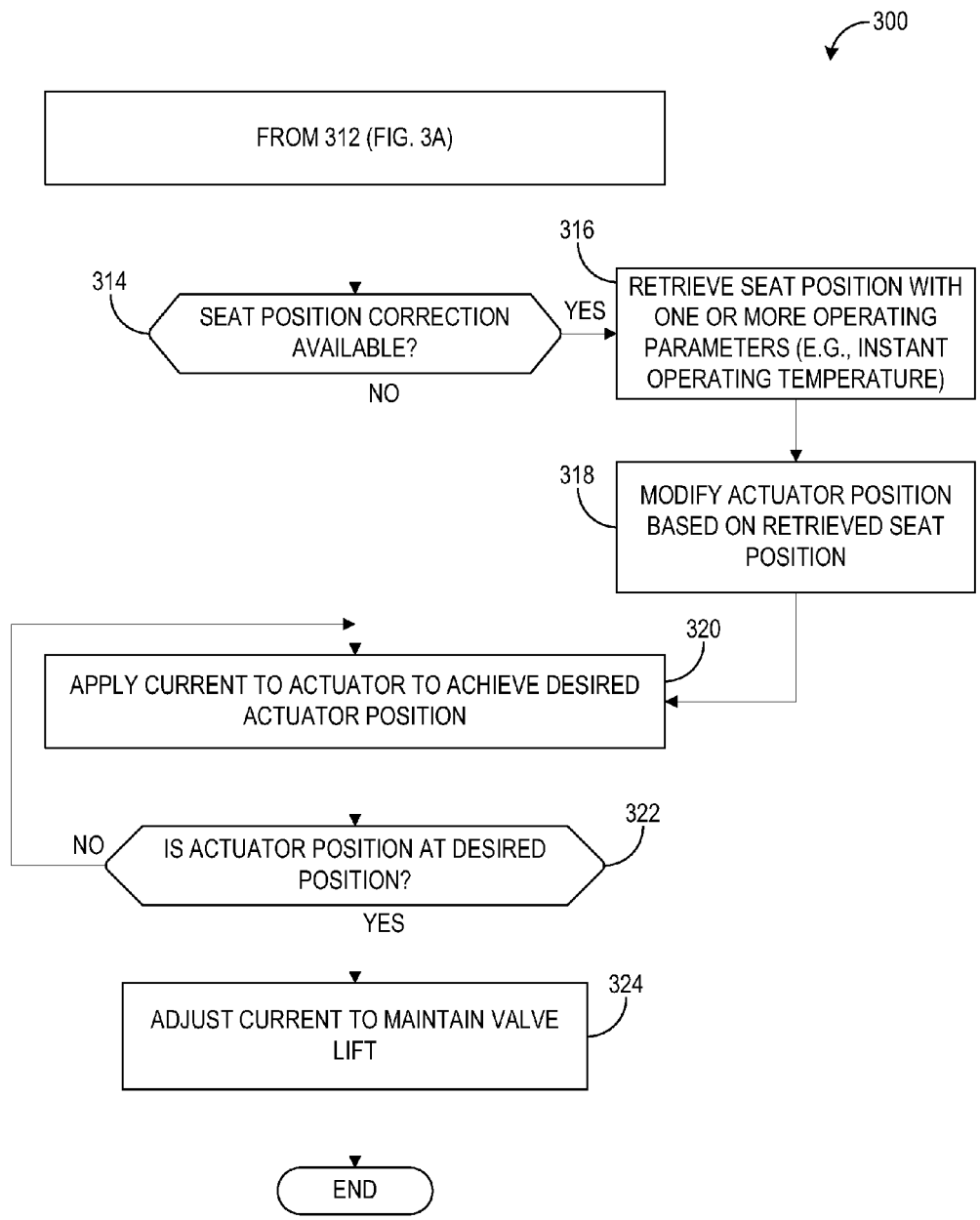
Figure 4:
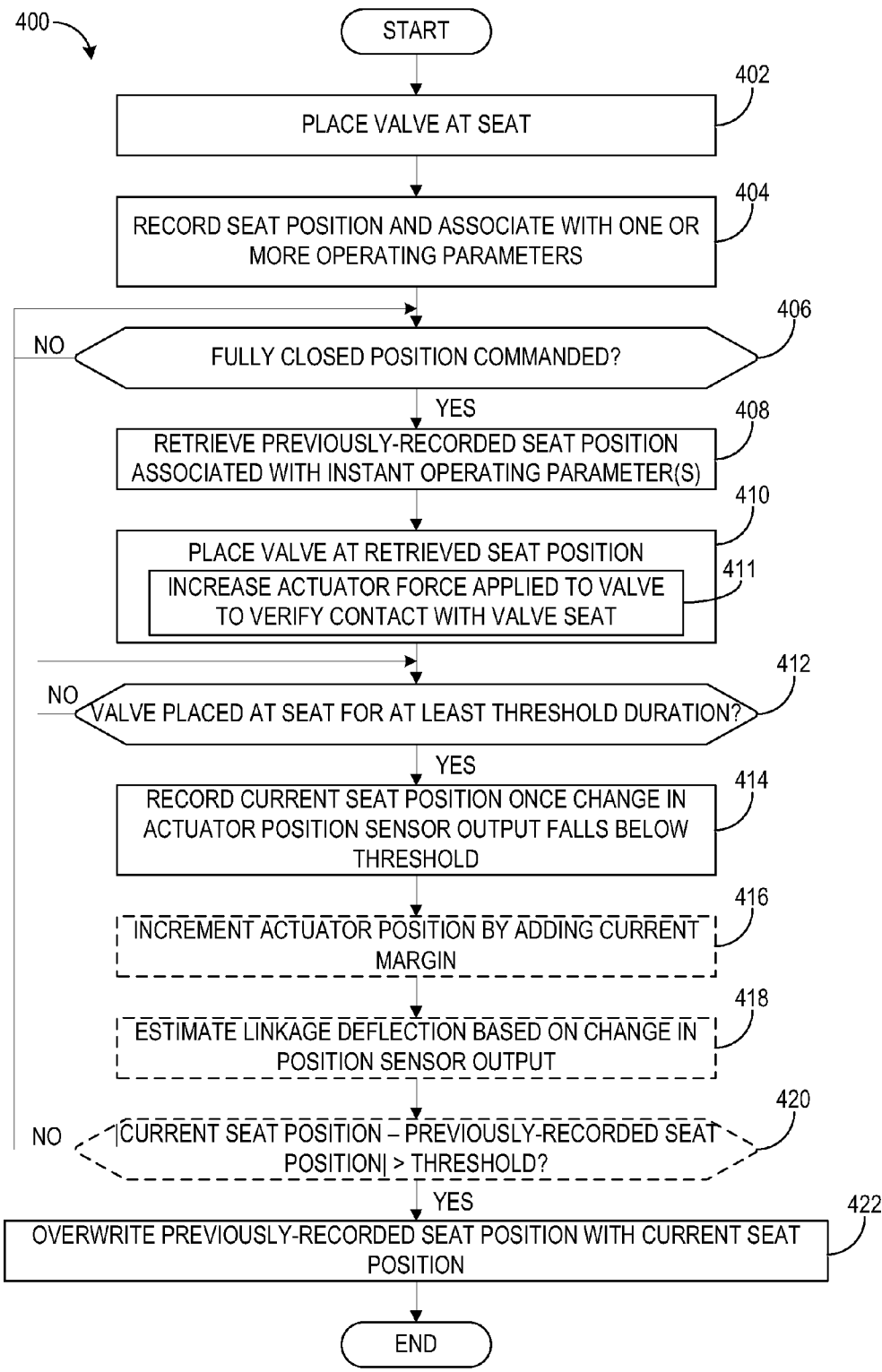
FIG. 4 shows a flowchart illustrating a method for determining the position of a wastegate valve seat of the wastegate arrangement of FIG. 2.
Figure 5:
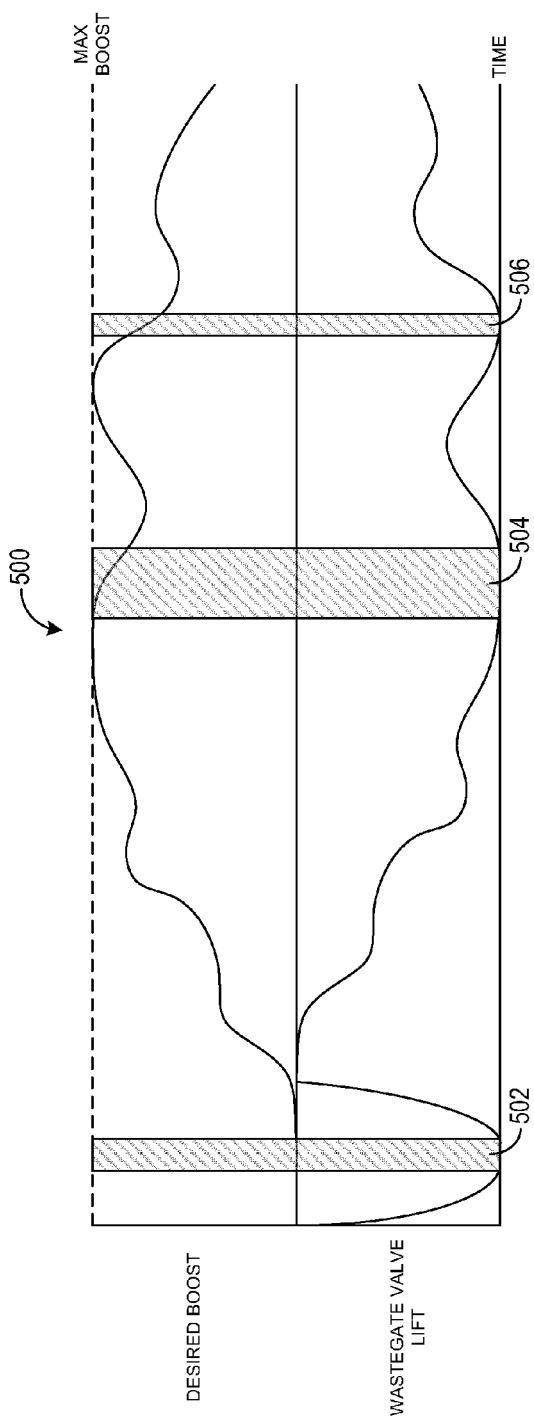
FIG. 5 shows a map illustrating determination of the position of the wastegate valve seat of the wastegate arrangement of FIG. 2 in an exemplary drive cycle.
Figure 6:
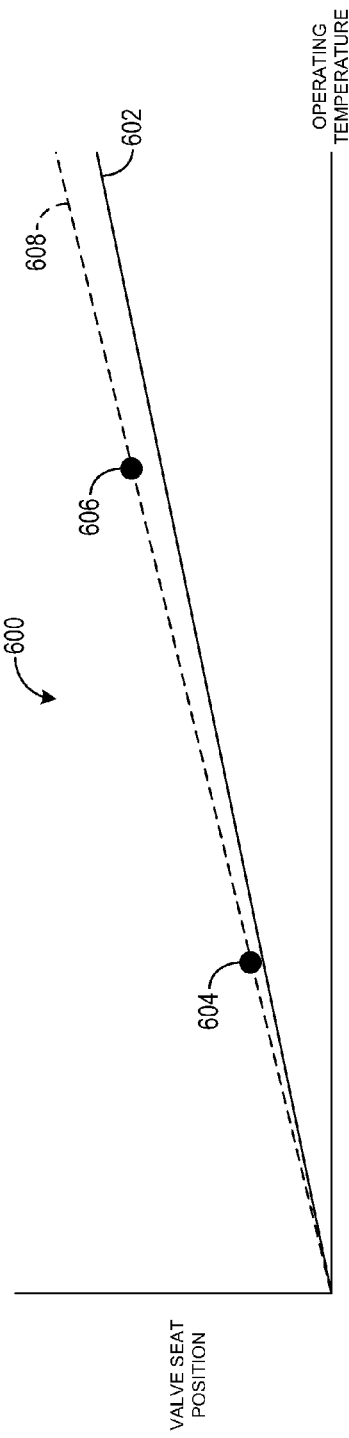
FIG. 6 illustrates dynamically updating a map of a plurality of wastegate valve seat positions each associated with an operating temperature.

Various methods for compensating variation in the geometry and position of linkages and valve seats in wastegate assemblies are thus provided. In one example, a method of operating a wastegate in an internal combustion engine comprises, at engine startup, placing a wastegate valve at a seat, recording a position of the seat and associating the seat position with one or more operating parameters, and modifying a position of a wastegate actuator based on the seat position throughout engine operation. FIG. 1 shows a block diagram of a turbocharged engine including a wastegate, FIG. 2 shows an exemplary arrangement of the wastegate of FIG. 1, FIGS. 3A & 3B show a flowchart illustrating a method for controlling a turbocharger associated with the wastegate arrangement of FIG. 2, FIG. 4 shows a flowchart illustrating a method for determining the position of a wastegate valve seat of the wastegate arrangement of FIG. 2, FIG. 5 shows a map illustrating determination of the position of the wastegate valve seat of the wastegate arrangement of FIG. 2 in an exemplary drive cycle, and FIG. 6 illustrates dynamically updating a map of a plurality of wastegate valve seat positions each associated with an operating temperature. The engine of FIG. 1 also includes a controller configured to carry out the methods depicted in FIGS. 3 and 4.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

An exhaust-side temperature sensor 79 is shown positioned upstream of an inlet side of turbine 62 and downstream at an outlet side of exhaust manifold 46. Exhaust-side temperature sensor 79 may be particularly configured to sense turbine inlet temperature and relay this sensed temperature as a signal TT to controller 12. Sensor 79 may be a thermocouple, for example. More generally, exhaust temperature may be measured by sensors 79 and/or other sensors not shown located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric or a pneumatic actuator, for example. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In this example, actuator 202 is an electric actuator including an electric motor, though other suitable actuators are possible (e.g., a solenoid). An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 22, which may be exhaust manifold 46 of engine 10 in FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be controlled via actuation of actuator 202 and placement of its output shaft 201, movements of which may be translated to the exhaust valve via linkage 204.

As shown, wastegate 200 further includes a position sensor 224 that may be configured to measure the location of wastegate valve 218 based on changes in the angle of output shaft 201. In some examples, a rotary encoder configured to sense rotation of a rotating component in actuator 202 may be employed, with pulses generated therefrom sent to controller 12 in FIG. 1. Position sensor 224 may be adapted for embodiments in which a linear rod linkage is used in lieu of the four-bar configuration shown in FIG. 2, however. In any case, a measurement by position sensor 224 may be used to determine the position of wastegate valve 218, particularly the distance from the top surface of valve seat 220 to the bottom surface of wastegate valve 218. In other embodiments, however, the position of wastegate valve may be determined based on a soft model using one or more of the signals (e.g., BOOST) described above with reference to FIG. 1 and sent to controller 12.

FIG. 2 also illustrates how variation in the geometry (e.g., length) of linkage 204 and its constituent links may occur. In some scenarios, variation in the geometry of linkage 204 occurs due to high surrounding temperatures generated in part by hot exhaust gasses travelling through exhaust passage 222. As the temperature of linkage 204 varies, the linkage and its constituent links may expand, and in other scenarios, contract. This may include variation in the distance between pivot points 208 and 212. As such, the accuracy of wastegate valve position sensing may decrease, resulting in inaccurate supply of boost to an engine.

Physical deformation or deflection may occur in linkage 204 for other reasons. At high loads (e.g., mechanical load on wastegate valve 218), for example, high exhaust pressures due to exhaust gas travelling through exhaust passage 222 act against the bottom surface of wastegate valve 218 in a direction substantially aligned to a direction E. To compensate for such exhaust forces, and to position wastegate valve 218 at a position responsive to desired boost levels, an approximately equal and opposite actuator force is transmitted to the top of the wastegate valve at the point at which fourth link 216 is joined thereto, through linkage 204 from actuator 202, the force shown in the figure as being aligned to a direction A. Being responsive to the high exhaust pressures and resulting significant exhaust forces, the actuator force may cause variation (e.g., expansion, contraction in length, bending, etc.) in the geometry of linkage 204, which may be referred to herein as "deflection" or "deformation". Such deflection is represented by a deflected linkage 226 illustrated in broken lines. While the position of deflected linkage 226 is offset from linkage 204, both linkages correspond to the same valve position. It may accordingly be seen how position sensor 224 may detect two different linkage positions, and thus positions of wastegate valve 218, respective to linkage 204 and deflected linkage 226. Detection of two different wastegate valve positions when wastegate valve 218 is oriented at a single lift (e.g., separation between the bottom surface of the valve and the top surface of valve seat 220) may occur for a plurality of deflected linkages compared to their non-deflected counterparts.

Linkage deformation may result in other errors in wastegate valve position tracking. For example, in some scenarios a deflected linkage may cause position sensor 224 to provide a detected position of wastegate valve 218 at a first physical lift. When wastegate valve 218 is physically positioned at a second physical lift, different from the first physical lift though in some examples relatively close, position sensor 224 may provide the same detected position. In other words, position sensor 224 in this example provides the same detected lift for two different actual, physical lifts.

In some wastegate assemblies such as that of wastegate 200, linkage deflection occurring to an extent that affects boost delivery to an unacceptable degree may begin to manifest above a threshold load at which forces (e.g., actuator and exhaust forces) above a force threshold are exerted on wastegate valve 218. It will be noted that in this context load refers to the physical load on wastegate valve 218 due to one or both of force imparted by actuator 202 and force imparted by exhaust flow through exhaust passage 222. As such, routines may compensate for linkage deflection above a wastegate valve load threshold.

It will be appreciated that wastegate 200 and various components therein may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance, if these two quantities are known or can be measured. Further, as described above, other types of linkages may be provided to couple actuator 202 with wastegate valve 218, including but not limited to a linear rod.

The thermal deformation (e.g., expansion, contraction, etc.) and mechanical deformation described above may occur at locations in a wastegate assembly other than at a linkage. For example, thermal and/or mechanical deformation may occur at valve seat 220 in wastegate 200, altering the position of the seat relative to what is nominally considered the seat position (e.g., during operating conditions in which thermal and/or mechanical deformation are not significant above a threshold). Variance in the seat position may cause a reduced supply of boost relative to a desired level of boost, or, in other scenarios, over-exertion by actuator 202 as valve seat 220 has been reached earlier than expected.

FIG. 2 illustrates a non-limiting example of the variance in the position of valve seat 220, showing a displaced exhaust passage and a deformed valve seat 228 resulting therefrom, both in dashed lines. As a particular non-limiting example, variation in the position of valve seat may be on the order of several tenths of a millimeter as surrounding exhaust temperatures vary throughout a range of several hundred degrees (e.g., from 300 to 950° C.). As described in further detail below, variance in the position of valve seat 220 may be compensated by measuring the location of the valve seat during instances in which wastegate valve 218 is placed at the seat—e.g., at engine startup as part of a calibration routine, throughout engine operation as the valve is commanded to be placed at the fully closed position to supply maximum boost, or when the avoidance of rattle is desired. A suitable data structure (e.g., lookup table) storing a plurality of seat positions each associated with respective operating parameters (e.g., one or more operating temperatures) may be formed such that seat positions may be retrieved from the data structure throughout engine operation to increase the accuracy of valve positioning by entering the data structure with measured and/or estimated temperatures (e.g., turbine inlet temperatures measured by exhaust-side temperature sensor 79). Lift commands (e.g., instructions generated by an engine controller dictating a location at which valve 218 is to be placed) may be modified in this way. The data structure may be initially formed offline prior to being programmed in an accessible storage medium (e.g., ROM 106 of controller 12 in FIG. 1) based on known geometric properties of the wastegate assembly (e.g., nominal linkage length and seat position, thermal properties of these and other components, etc.) and/or test data. Moreover, compensation of seat position variance may further include compensation of deflection in linkage 204 due to mechanical forces. It will be appreciated that the exemplary displaced exhaust passage and deformed valve seat 228 is provided as an example and is not intended to be limiting in any way; the valve seat and/or exhaust passage, as well as other proximate components in the wastegate assembly, may undergo other types of deformation and may do so in an anisotropic manner.

FIGS. 3A & 3B show a flowchart illustrating a method 300 for controlling a turbocharger associated with the wastegate arrangement of FIG. 2. Method 300 may be executed by an engine controller (e.g., controller 12 of FIG. 1) and utilized to control a turbocharger via a wastegate (e.g., wastegate 200 of FIG. 2). Wastegate actuator 202 of FIG. 2 in particular may be used to actuate the wastegate. In one example, a method of controlling the turbocharger via the wastegate may comprise determining a desired boost pressure and an actual boost pressure. The wastegate may be adjusted according to a difference between the desired boost pressure and the actual boost pressure.

At 302 the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 304, an actual boost pressure is determined. The actual boost may be directly measured from a sensor, such as sensor 123. The measurement may be sent to controller 12 via the BOOST pressure signal and stored in a computer-readable storage medium (e.g., ROM 106, RAM 108, and/or KAM 110 of controller 12 in FIG. 1). In an alternative embodiment, the actual boost pressure may be estimated based on other operating parameters, such as based on MAP and RPM, for example.

Next, at 306, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

Next, at 308, a difference between the actual and desired boost is determined. The engine controller may determine the difference, for example. In some examples, the difference may be determined by subtracting the desired boost from the actual boost.

Next, at 310, a wastegate valve lift is determined in order to reduce the difference between the actual and desired boost determined at 308. In some examples, the difference between the actual and desired boost, in addition to the current wastegate valve lift, is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feed-forward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 312, a desired actuator position is determined to achieve the wastegate valve lift determined at 310. The desired actuator position may be fed as an input to various suitable control mechanisms including those described above. In some embodiments, a desired actuator orientation may be alternatively determined, such as the rotational orientation of a rotating component in the actuator.

Turning now to FIG. 3B, method 300 continues to 314 where it is determined whether a correction for the wastegate valve seat position of the turbocharger is available. The position correction may be sought in an attempt to compensate errors in wastegate valve positioning due to physical changes in the wastegate assembly and its constituent components—for example, thermal deformation causing expansion and/or contraction in a linkage (four bar, linear rod, or other mechanism coupling the wastegate valve to the wastegate actuator), housing, and/or valve seat. Mechanical deformation and deflection in such components due to high actuator and/or exhaust forces may also be compensated. Determining whether a valve seat position correction is available may be carried out by accessing a suitable data structure (e.g., lookup table, map, etc.) storing a plurality of valve seat positions, each associated with one or more operating parameters, by using such one or more operating parameters as an index into the data structure. In some embodiments, a seat position having an associated operating parameter within a threshold range of the supplied operating parameter may be used. As a non-limiting example, the turbine inlet temperature TT signal supplied to controller 12 of FIG. 1 may be the operating parameter used to access the data structure, the turbine inlet temperature being an indication of the instant operating temperature and used to compare with the temperatures each associated with the plurality of seat positions in the data structure to determine seat position availability. The instant operating temperature may be instantaneous, or in some embodiments, a filtered temperature. For example, turbine inlet temperature may be filtered to obtain an estimate of metal temperature in the wastegate, as the correspondence (e.g., causal relation) between the temperature of metals in the wastegate and seat position may be stronger than that between turbine inlet temperature and seat position. Other measured temperatures may be alternatively or additionally used, such as the ECT signal measured via sensor 112 of FIG. 1. Operating temperatures estimated based on one or more operating parameters (e.g., speed, load, air-fuel ratio (AFR), spark retard, BOOST, etc.) may further be used.

In this way, measurement and/or estimation of one or more operating parameters may provide access to the data structure, yielding a seat position with which wastegate valve placement and lift command generation may be modified. Adaptive seat positioning may be thus provided for different scenarios—for example, the location of the valve seat may differ for a cold start relative to a hot restart. In some instances in which it is accessed, such as the initial firing of the engine and operation of the wastegate, the data structure may be comprised of seat positions (and associated parameter(s)) that have been generated offline based on known properties of the wastegate assembly, including but not limited to a nominal length of the linkage, a nominal valve seat position, thermal expansion/contraction properties of these and other components, etc. As described in further detail below, method 300 may include additional steps not shown that may be performed to determine whether a deflection correction for deflection in the linkage is available, and, if so, retrieve the deflection correction and modify the actuator position based on the retrieved deflection correction.

If it is determined that a valve seat position correction is available (YES), the method proceeds to 316. If it is determined that a valve seat position correction is not available (NO), the method proceeds to 320.

At 316 of the method, a valve seat position is retrieved with the one or more operating parameters. Here, the seat position retrieved may correspond to the seat position that would be measured if the valve was placed against the seat at the fully closed position under the current operating conditions. As described above, the one or more operating parameters may include the instant operating temperature such as the TT signal measured via sensor 79 of FIG. 1 and/or a filtered temperature (e.g., metal temperature).

Next, at 318 of the method, the position of the wastegate actuator is modified based on the seat position retrieved at 316. Here, the current actuator position may be modified based on a seat position that would be measured if the valve was placed against the seat under the current operating conditions, as described above. Modification may thus include referencing seat positions under known conditions. The actuator position may then be controlled based on the modification and a desired actuator position (e.g., desired actuator position determined at 312) such that the desired actuator position may be achieved while compensating thermal and mechanical effects via the retrieved seat position. Modification of the actuator position may be performed in various suitable manners and may be adapted to the type of actuator used—for example, modification may include adjusting the position of the output shaft of the actuator in some embodiments. As a non-limiting example, modification of the actuator position based on the retrieved seat position may include increasing the actuator position for scenarios in which the retrieved seat position corresponds to a location farther away than a nominally expected (or previously-retrieved) seat position (e.g., in the event of high exhaust temperatures causing thermal expansion), or, conversely, decreasing the actuator position for scenarios in which the retrieved seat position corresponds to a location closer than a nominally expected (or previously-retrieved) seat position. More generally, in some embodiments, lift commands generated by the engine controller that specify a valve lift may be modified based on retrieved seat positions.

Next, at 320 of the method, current is applied to the actuator to achieve the desired actuator position, which may be a corrected actuator position if a valve seat position was successfully retrieved at 316 or a non-corrected actuator position if a seat position was not available. A suitable voltage-to-current conversion mechanism may convert a voltage generated by the engine controller to generate the current. The actuator position is thus controlled based on the desired actuator position and modification described above.

Next, at 322 of the method, it is determined whether the actuator position is at the desired actuator position. Here, the sensed actuator position may be compared to the desired actuator position. In some embodiments, differences between the corrected actuator position and desired actuator position below a threshold may be ignored. If the actuator position is not at the desired actuator position (NO), the method returns to 320. If the actuator position is at the desired actuator position (YES), the method proceeds to 324.

At 324 of method 300, the current applied to the actuator is adjusted to maintain the desired valve lift and control the actuator position. The desired valve lift may be maintained via feedback and/or feed-forward control algorithms. For example, valve lift may be controlled via an inner control loop. Thus, the applied current is adjusted when the corrected actuator position reaches a position corresponding to a desired wastegate valve position.

Turning now to FIG. 4, a flowchart illustrating a method 400 for determining the position of wastegate valve seat 220 of the wastegate arrangement of FIG. 2 is shown. In particular, the method may be utilized to amass the data structure described above—e.g., a data structure comprising a plurality of wastegate valve seat positions each associated with one or more operating parameters (e.g., turbine inlet temperature).

At 402 of the method, a wastegate valve such as valve 218 of FIG. 2 is placed at the wastegate valve seat, for example by operating wastegate actuator 202. The seat position may be retrieved from a data structure comprising a plurality of seat positions initially formed offline prior to being programmed into a computer readable storage medium (e.g., ROM 106 of FIG. 1). Placing the wastegate valve at the valve seat at 402 may be part of an overall diagnostic and/or calibration routine that may be performed at engine startup (e.g., at each and every startup).

Next, at 404 of the method, the position of the wastegate valve seat is recorded and associated with one or more operating parameters. The position of the valve seat may be measured in various suitable manners, for example by detecting that change in the output from a wastegate actuator position sensor (e.g., sensor 224 of FIG. 2) has fallen below a threshold, indicating that the position of the wastegate valve corresponds to that of the seat and is no longer undergoing motion beyond a threshold. The valve seat position may be recorded in the data structure along with one or more operating parameters such as the instant (e.g., current) turbine inlet temperature. In this way, initial recordation of the valve seat position at 404 at the beginning of a drive cycle may inform the generation of subsequent lift commands and wastegate valve positioning by associating a measured seat position with the true fully closed position. In some embodiments, initial determination of the seat position may include incrementing the position of the wastegate actuator (e.g., by adding a current margin to the current being presently supplied to the actuator) to ensure that the valve seat has been reached. Contact with the valve seat may be considered to be successful when change in the output from the wastegate actuator position sensor falls below a threshold during application of the current margin, as described in further detail below.

Next, at 406 of the method, it is determined whether the fully closed position has been commanded—in other words, whether a lift command stipulating that the wastegate valve be positioned at its valve seat has been received. Such lift commands may be generated by the engine controller during instances in which maximum boost is requested, for example, in addition to the diagnostic and/or calibration periods described above. If it is determined that the fully closed position has been commanded (YES), the method proceeds to 408. If it is determined that the fully closed position has not been commanded (NO), the method returns to 406.

At 408 of the method, a valve seat position previously-recorded in the data structure and associated with one or more instant operating parameters is retrieved. For example, the instant (and/or filtered) turbine inlet temperature may be used to retrieve a seat position recorded and associated with a previous turbine inlet temperature. A difference between the instant (and/or filtered) turbine inlet temperature and the previous turbine inlet temperature may be less than a pre-determined threshold (e.g., 50°) to facilitate sufficient seat position compensation.

Next, at 410 of the method, the wastegate valve is placed at the seat position retrieved at 408. In some examples, the wastegate valve is continually moved closer to the valve seat by incrementing the wastegate actuator position until output from the wastegate actuator position sensor falls below a threshold, which may indicate that the true seat position has been reached and that the wastegate actuator position cannot be significantly increased without increasing the current being presently supplied to the actuator above a current margin. Such an approach may be utilized, as, in some scenarios, the true seat position may have changed relative to the previously-recorded seat position retrieved at 408. By incrementing the actuator position, the valve is brought either closer to, or in increasing contact with, the true seat position. In this way, it may be ascertained whether the true seat position has been reached and the valve is in contact therewith, or if the valve is actually separated a distance away from the true seat position and is not in contact therewith. As such, the method includes, at 411, increasing a force applied by the wastegate actuator to the wastegate valve to verify contact with the wastegate valve seat.

Next, at 412 of the method, it is determined whether the wastegate valve has been placed at the valve seat for at least a threshold duration. If the valve has been placed at the seat for at least the threshold duration (YES), the method proceeds to 414. If the valve has not been placed at the seat for at least the threshold duration (NO), the method returns to 412. In this way, robust wastegate valve seat position determination may be provided by keeping the valve at the seat for at least a minimum time.

Next, at 414 of the method, the current seat position is recorded once the change in the output from the actuator position sensor falls below a threshold. As described above, wastegate actuator position sensor output falling below the threshold may be interpreted as an indication that contact with the true seat position has been reached, prompting its recordation.

Next, at 416 of the method, the wastegate actuator position may optionally be further incremented by adding a current margin to the current being presently supplied to the actuator. This current margin may be greater than the maximum current supplied to the actuator at 410 and 414 even in the presence of maximal exhaust forces. Although true contact between the wastegate valve and the valve seat may have been achieved, increasing contact therebetween is effected by increasing the actuator force and thus the force with which the valve is abutted against the seat. Accordingly, the output from the wastegate position sensor may vary, giving an indication of deflection (e.g., bending) in the wastegate actuator-valve linkage described above. In other words, the change in output from the wastegate actuator position sensor may result from incrementing the position of the wastegate actuator. As such, method 400 includes optionally estimating the linkage deflection based on the change in wastegate actuator position sensor output at 418.

In this way, the data structure storing a plurality of seat positions each associated with one or more operating parameters (e.g., turbine inlet temperature) may be augmented with a plurality of deflection corrections which in turn may be associated with one or more of the same or different operating temperatures. Thus, in some examples, the data structure may comprise a plurality of wastegate valve seat positions each associated with a respective operating temperature and a respective deflection correction. The plurality of deflection corrections may be stored and retrieved via a separate data structure or other suitable method, however. Accordingly, method 300 of FIG. 3 may be modified to determine whether a deflection correction is available, and if so, modify the wastegate actuator position based on a retrieved deflection correction. For embodiments in which a sensor configured to measure the force imparted by the wastegate actuator (e.g., to the linkage) is available, linkage deflection may be estimated and compensated based on the following exemplary relation: $D=(m*F)+b$, where D is the linkage deflection, F is the force applied to the linkage, and m and b are constants. For embodiments in which the actuator is an electric motor, the actuator force F (e.g., motor force) may be converted to a current value based on known relations relating motor current to motor force/torque.

Next, at 420 of the method, it is optionally determined whether the absolute value of the difference between the current seat position ascertained after incrementing the actuator position at 416 and the previously-recorded seat position retrieved at 408 exceeds a threshold. If the absolute value of this difference exceeds the threshold (YES), the method proceeds to 422. If the absolute value of this difference does not exceed the threshold (NO), the method returns to 406. It will be understood that steps 406 through 414 (and, optionally, steps 420 and 422 in addition) may be performed iteratively throughout a drive cycle for each fully closed position command that is received such that a current seat position may be recorded each time the wastegate valve is placed at the valve seat. In this way, a comprehensive data structure may be formed that comprises a plurality of wastegate valve seat positions each associated with one or more operating parameters, facilitating increased valve positioning accuracy throughout and among drive cycles. The data structure may also compensate longer-term changes in the wastegate assembly affecting wastegate positioning that result from non-ephemeral causes—e.g., long-term mechanical wear, as well as linkage deflection described above.

Finally, at 422 of the method, the previously-recorded seat position retrieved at 408 is overwritten with the currently determined seat position. In this way, the data structure is accurately updated to reflect changes in the position of the wastegate valve seat, among others.

As shown and described, methods 300 and 400, respectively depicted in FIGS. 3 and 4, may be implemented to increase the accuracy of wastegate valve positioning and thus boost control in a turbocharged internal combustion engine. Specifically, changes in the location of the wastegate valve seat, expansion and/or contraction in the wastegate valve-actuator linkage, physical variation in the wastegate assembly, long-term wear, and other thermally and mechanically-driven effects may be compensated via implementation of these methods. Moreover, the methods compensate such changes by utilizing existing, naturally arising opportunities in which the wastegate valve is placed at the valve seat—for example as part of a diagnostic and/or calibration procedure at engine startup, as well as conditions in which maximum boost is desired. It will be appreciated that various suitable modifications may be made to methods 300 and 400 without departing from the scope of this disclosure. For example, the one or more operating parameters with which seat positions, as well as linkage deflection corrections, may be associated may be selected from virtually any measurable or estimable parameter described herein, including but not limited to those represented by signals received at controller 12 of FIG. 1.

Turning now to FIG. 5, a map 500 illustrating determination of the position of the wastegate valve seat of the wastegate arrangement of FIG. 2 in an exemplary drive cycle is shown. Specifically, map 500 shows a desired boost for the exemplary drive cycle, generated at least in part by the boost requested by a vehicle operator, which varies significantly throughout, starting from a region in which no boost is desired and reaching a maximum achievable boost for two approximately contiguous durations. Map 500 also shows the lift of wastegate valve 218 as it is controlled (e.g., by actuator 202) in response to the desired boost. It will be appreciated that the correspondence in shape of the desired boost and wastegate valve lift throughout map 500 is provided as an example and is not intended to be limiting in any way. In addition, the wastegate valve lift is shown as lagging behind the desired boost; the amount of such lag may be exaggerated for the sake of clarity.

As seen in FIG. 5, the wastegate valve is initially placed at a fully open position (e.g., placed as far away from the wastegate valve seat as possible) but quickly moved toward the fully closed position in a duration 502 to achieve contact with the seat as part of the diagnostic and/or calibration procedure described above. The wastegate valve may be initially placed at locations other than the fully open position, however. Here, complete or approximate contact with the valve seat may be achieved in duration 502, depending on the seat position retrieved and the operating conditions during this time (e.g., depending on whether initiation of the drive cycle is a cold start or hot restart, or somewhere therebetween). As such, the position of wastegate actuator 202 may be incremented to ensure true contact with the valve seat. With seat contact achieved, the seat position is recorded (e.g., in the form of an actuator voltage or relative or absolute valve position), represented in the figure with shading. It will be noted, however, that the length of duration 502 may be exaggerated, and that the change in wastegate valve lift—particularly its approximately quadratic nature—prior to and following the duration is merely exemplary and may take other forms.

At other durations 504 and 506, seat position learning is carried out by utilizing opportunities that naturally arise in the course of the drive cycle in which the wastegate valve is placed at the valve seat. These opportunities may arise as a result of the desired boost reaching the maximum achievable boost, for example. As described above, seat positions learned during these times may be associated with one or more operating parameters (e.g., turbine inlet temperature) and potentially used to overwrite existing seat positions whose associated operating parameter(s) are within range of those associated with the newly-recorded seat positions. In this way, a data structure comprising a plurality of seat positions may be dynamically updated to provide adaptive wastegate control.

FIG. 6 illustrates dynamically updating a map 600 of a plurality of wastegate valve seat positions each associated with an operating temperature (e.g., turbine inlet temperature). The plurality of valve seat positions may correspond to those assumed by valve seat 220 of FIG. 2, for example, and may be learned according to method 400 of FIG. 4 and during opportunities illustrated in map 500 of FIG. 5.

In particular, map 600 includes a first function 602 comprising a plurality of wastegate valve seat positions, each associated with an operating temperature, that may be learned offline and programmed into map 600 prior to engine and/or wastegate operation based on known properties of a wastegate assembly. Throughout engine operation, seat positions may be retrieved from first function 602 by supplying an operating temperature and used to modify wastegate actuator positions and/or wastegate lift commands in the manners described above. Map 600 also shows two data points—a first data point 604 and a second data point 606—learned online during engine operation and via the methods described above. Data points 604 and 606 are particularly valve seat positions, and, as shown, deviate from first function 602, as they were collected under conditions in which the wastegate assembly assumed different thermal and/or mechanical properties—e.g., high exhaust temperatures caused thermal expansion in the wastegate assembly. Accordingly, in some embodiments, a new, second function 608 may be formed based on data points 604 and 606 (and others subsequently collected) to reflect changes in the wastegate assembly and provide adaptive wastegate positioning. Various suitable curve fitting techniques may be employed to derive second function 608, for example. FIG. 6 thus illustrates how a map or other data structure facilitating valve seat position correction for a substantial range of operating conditions may be formed by collecting a discrete sample of valve seat positions and employing interpolation to provide corrections for operating conditions differing from those at which the sample was collected. In this way, adaptive valve positioning may be provided for circumstances that do not afford many opportunities for seat position learning.

It will be appreciated that map 600, and first and second functions 602 and 608, are provided as examples and are not intended to be limiting in any way. Particularly, the first and second functions are shown as being approximately linear, but may assume other forms depending on the wastegate assembly and operating characteristics. Further, map 600 is one example of a variety of suitable data structures that may be formed via the approaches described herein. Also, map 600 (or another data structure) may be modified to store a plurality of valve seat position corrections, rather than seat positions themselves. In addition, map 600 may be comprised of a plurality of discrete data points for embodiments in which interpolation is not utilized.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a wastegate in an internal combustion engine, comprising:
    at engine startup, placing a wastegate valve at a seat;
    recording a position of the seat and associating the seat position with an operating temperature; and
    modifying a position of a wastegate actuator based on the seat position throughout engine operation, including, each time the wastegate valve is placed at the seat, increasing a force applied by the wastegate actuator to the wastegate valve to verify contact with the seat, determining a current position of the seat and the current operating temperature, and updating a previously-recorded position of the seat with the current position of the seat at the current operating temperature, to form a plurality of seat positions each associated with respective operating temperatures.

2. The method of claim 1, further comprising overwriting a previously-recorded position of the seat with the current position of the seat if a difference between an absolute value of the previously-recorded position of the seat and the current position of the seat exceeds a threshold.

3. The method of claim 1, further comprising, as the wastegate valve is placed at the seat throughout engine operation, incrementing the position of the wastegate actuator by adding a current margin to a current presently supplied to the wastegate actuator, and estimating deflection in a linkage coupling the wastegate valve to the wastegate actuator based on a change in output from a wastegate actuator position sensor, the change in output resulting from incrementing the position of the wastegate actuator.

4. The method of claim 1, wherein the plurality of seat positions is stored in a data structure in a computer-readable storage medium.

5. The method of claim 4, wherein placing the wastegate valve at the seat includes:
    retrieving a previously-recorded position of the seat from the data structure;
    placing the wastegate valve at the previously-recorded position of the seat;
    incrementing the position of the wastegate actuator by adding a current margin to a current presently supplied to the wastegate actuator; and
    recording a current position of the seat once output from a wastegate actuator position sensor falls below a threshold.

6. The method of claim 4, wherein modifying the position of the wastegate actuator includes retrieving a previously-recorded position of the seat associated with the current operating temperature by accessing the data structure with the current operating temperature.

7. The method of claim 4, wherein the data structure is a lookup table.

8. The method of claim 4, wherein the data structure comprises a plurality of positions of the seat generated offline prior to being programmed in the data structure.

9. The method of claim 4, wherein the data structure comprises a plurality of deflection corrections each associated with the operating temperature for compensating deflection in a linkage coupling the wastegate valve to the wastegate actuator.

10. The method of claim 1, wherein the wastegate valve is placed at the seat when maximum boost is requested.

11. The method of claim 1, wherein the operating temperature includes a turbine inlet temperature.

12. A method for controlling a wastegate valve coupled through a linkage to an actuator for diverting gases from a turbocharger, comprising:
    determining a wastegate valve lift to reduce a difference between a desired boost and an actual boost;
    determining a desired wastegate actuator position to achieve the wastegate valve lift;
    retrieving a position of a wastegate valve seat from a data structure, the data structure holding a plurality of positions of the wastegate valve seat each associated with respective operating temperatures;
    modifying the desired wastegate actuator position based on the retrieved position of the wastegate valve seat;
    upon receiving a fully closed command, placing the wastegate valve at a fully closed position;
    increasing a force applied by the wastegate actuator to the wastegate valve to verify contact with the wastegate valve seat;
    determining a current position of the wastegate valve seat; and
    updating a previously-recorded position of the wastegate valve seat with the current position of the wastegate valve seat at a current operating temperature.

13. The method of claim 12, further comprising, at engine startup, placing the wastegate valve at the fully closed position, and adding a current position of the wastegate valve seat corresponding to the fully closed position of the wastegate valve to the data structure, the current position of the wastegate valve seat associated with the current operating temperature.

14. The method of claim 13, wherein placing the wastegate valve at the fully closed position includes:
    retrieving a previously-recorded position of the wastegate valve seat from the data structure;
    placing the wastegate valve at the previously-recorded position of the wastegate valve seat;
    incrementing a current wastegate actuator position by adding a current margin to a current presently supplied to the wastegate actuator; and
    adding the current position of the wastegate valve seat to the data structure once output from a wastegate actuator position sensor falls below a threshold.

15. The method of claim 12, wherein the operating temperature comprises a turbine inlet temperature.

16. The method of claim 12, wherein increasing the force applied by the wastegate actuator to the wastegate valve comprises incrementing a current wastegate actuator position by adding a current margin to a current presently supplied to the wastegate actuator, the method further comprising:

determining deflection in a linkage based on a change in output from a wastegate actuator position sensor, the change in output resulting from incrementing the current wastegate actuator position.

17. The method of claim 16, further comprising adding a deflection correction to the data structure based on the determined deflection, the deflection correction for compensating deflection in the linkage and associated with the operating temperature.

18. A method of operating a wastegate valve via a wastegate actuator, comprising:

placing the wastegate valve between a fully open position and a fully closed position responsive to a desired boost;

placing the wastegate valve at the fully closed position responsive to a request of maximum boost;

increasing a force applied by the wastegate actuator to the wastegate valve to verify contact with a wastegate valve seat;

determining a current position of the wastegate valve seat; and updating a previously-recorded position of the wastegate valve seat with the current position of the wastegate valve seat at an operating temperature.

19. The method of claim 18, wherein the current position of the wastegate valve seat is one of a plurality of wastegate valve seat positions stored in a data structure, each of the plurality of wastegate valve seat positions associated with a respective operating temperature and a respective deflection correction.

\* \* \* \* \*